(12) United States Patent
Ono et al.

(10) Patent No.: US 8,417,107 B2
(45) Date of Patent: Apr. 9, 2013

(54) IMAGE PICKUP APPARATUS AND LENS POSITION ADJUSTMENT METHOD

(75) Inventors: Riichi Ono, Tokyo (JP); Shuji Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 259 days.

(21) Appl. No.: 11/651,564

(22) Filed: Jan. 10, 2007

(65) Prior Publication Data
US 2007/0177861 A1    Aug. 2, 2007

(30) Foreign Application Priority Data

Jan. 16, 2006   (JP) ............................... P2006-007459

(51) Int. Cl.
*G03B 3/10*   (2006.01)
(52) U.S. Cl.
USPC ........................................... 396/133; 396/80
(58) Field of Classification Search .............. 396/133, 396/72, 75, 80, 101; 348/342, 354, 356; 359/823; 382/210, 263, 264
See application file for complete search history.

(56) References Cited

U.S. PATENT DOCUMENTS

| | | | |
|---|---|---|---|
| 4,537,487 A | | 8/1985 | Taniguchi et al. |
| 4,789,901 A | * | 12/1988 | Augusti et al. ............... 358/446 |
| 4,967,280 A | * | 10/1990 | Takuma et al. ............... 348/355 |
| 5,017,955 A | * | 5/1991 | Kotani ........................... 396/61 |
| 5,640,225 A | | 6/1997 | Nakata |
| 5,664,238 A | * | 9/1997 | Nishiyama .................... 396/101 |
| 5,715,483 A | * | 2/1998 | Omata et al. ................... 396/80 |
| 6,181,474 B1 | * | 1/2001 | Ouderkirk et al. ............ 359/629 |
| 6,910,060 B2 | * | 6/2005 | Langan et al. ................ 708/819 |
| 7,456,898 B2 | * | 11/2008 | Hirasawa et al. ............. 348/354 |
| 7,570,831 B2 | * | 8/2009 | Shaked et al. ................ 382/260 |
| 7,689,023 B2 | * | 3/2010 | Rabinovich ................... 382/133 |
| 2003/0041084 A1 | * | 2/2003 | Langan et al. ................ 708/819 |
| 2003/0048372 A1 | * | 3/2003 | Yasuda .......................... 348/349 |
| 2003/0063211 A1 | * | 4/2003 | Watanabe et al. ............. 348/345 |
| 2004/0193670 A1 | * | 9/2004 | Langan et al. ................ 708/819 |
| 2004/0202461 A1 | * | 10/2004 | Nakahara ...................... 396/104 |
| 2005/0001916 A1 | * | 1/2005 | Takita ............................ 348/308 |
| 2005/0007486 A1 | * | 1/2005 | Fujii et al. ..................... 348/345 |

(Continued)

FOREIGN PATENT DOCUMENTS

| | | |
|---|---|---|
| EP | 1 494 464 A2 | 1/2005 |
| JP | 04-000421 | 1/1992 |

OTHER PUBLICATIONS

International Search Report mailed Mar. 28, 2011, issued in counterpart European Patent Application No. 07250182 (6 pages).

*Primary Examiner* — Clayton E Laballe
*Assistant Examiner* — Linda B Smith
(74) *Attorney, Agent, or Firm* — Finnegan, Henderson, Farabow, Garrett & Dunner LLP.

(57)   ABSTRACT

Disclosed herein is an image pickup apparatus including, a lens driving control section configured to execute driving control of a lens, and a main control section configured to produce lens driving control information as setting information of a lens driving mode of the lens driving control section, the main control section produces lens driving control information which includes a final setting position for the lens and a returning amount as a distance over which the lens is returned after the lens passes the setting position, the lens driving control section being operable to execute a process of moving the lens to pass the setting position once in response to the setting position and the returning amount and then execute a returning process by the returning amount to position the lens to the setting position.

6 Claims, 9 Drawing Sheets

U.S. PATENT DOCUMENTS

| | | | |
|---|---|---|---|
| 2005/0041113 A1* | 2/2005 | Nayar et al. | 348/219.1 |
| 2005/0052563 A1* | 3/2005 | Yasuda | 348/345 |
| 2005/0093970 A1* | 5/2005 | Abe et al. | 348/14.05 |
| 2005/0128341 A1 | 6/2005 | Murakami | |
| 2005/0249488 A1* | 11/2005 | Takei | 396/101 |
| 2006/0227238 A1* | 10/2006 | Kuroki et al. | 348/353 |
| 2007/0053573 A1* | 3/2007 | Rabinovich | 382/133 |
| 2007/0115568 A1* | 5/2007 | Akiba et al. | 359/824 |

* cited by examiner

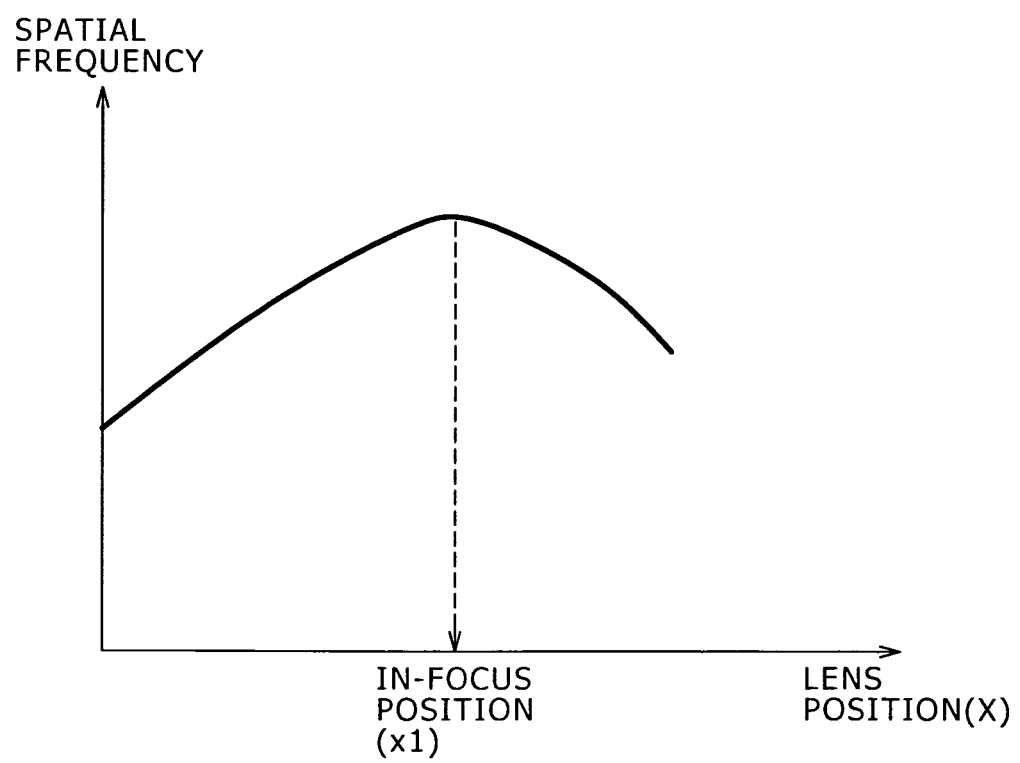

IN-FOCUS POSITION > THRESHOLD VALUE (Pth)
IN THIS INSTANCE, RETURNING AMOUNT [Xa]
IS APPLIED

IN-FOCUS POSITION < = THRESHOLD VALUE (Xth)
IN THIS INSTANCE, LENS IS RETURNED TO LENS
ORIGIN POSITION [0] WITHOUT FAIL

IMAGE PICKUP APPARATUS AND LENS POSITION ADJUSTMENT METHOD

CROSS REFERENCES TO RELATED APPLICATIONS

The present invention contains subject matter related to Japanese Patent Application JP 2006-007459 filed in the Japanese Patent Office on Jan. 16, 2006, the entire contents of which being incorporated herein by reference.

BACKGROUND OF THE INVENTION

1. Field of the Invention

This invention relates to an image pickup apparatus and a lens position adjustment apparatus, and more particularly to an image pickup apparatus and a lens position adjustment method wherein adjustment of the lens position or driving of the lens is performed, for example, for focusing control.

2. Description of the Related Art

An image pickup apparatus such as a still camera or a video camera incorporates an automatic focusing mechanism for automatically focusing on an image pickup subject. As one of common methods for focusing control, a method of discriminating the degree of the contrast of pickup image data acquired through a lens is available. According to the method just mentioned, a particular region of a picked up image is set as a signal acquisition region (spatial frequency extraction area) for focusing control. Then, it is decided that, as the particular region indicates a higher contrast, the image pickup data is nearer to an in-focus state, and where the contrast is low, the image pickup data is far from an in-focus state. Then, the lens is driven so as to raise the contrast to adjust the focus.

As a contrast decision processing method, a method is applied wherein high frequency components in a particular region are extracted and integration data of the extracted high frequency components is produced and then the level of the contrast is decided based on the produced high frequency component integration data. In particular, a high frequency component integration value is calculated for the decision of the level of the contrast and used as an evaluation value. A focusing lens is driven so as to maximize the evaluation value thereby to achieve automatic focusing. It is to be noted that focusing and a driving method for a lens are disclosed, for example, in Japanese Patent Laid-Open No. Hei 4-000421.

In order to carry out automatic focusing, it is necessary to drive the lens using an evaluation value described above as a pointer. The lens driving mechanism is formed typically from a voice coil motor. However, a lens driving mechanism including a voice coil motor or the like generally has a hysteresis. Therefore, if the control voltage value determined based on the evaluation value is applied to the voice coil motor to perform lens driving control, then this gives rise to a problem that the lens position differs depending upon whether the application voltage is set to a target voltage value (V1) from a minimum value (MIN) or is set to the target voltage value (V1) from a maximum value (MAX).

In order to solve the problem just described, for example, the following process is performed. In particular, if a target voltage value (V1) is determined, then the application voltage to a lens driving mechanism including a voice coil motor or the like is set once to the minimum value (MIN) so that the lens is positioned at an end of a driving range therefor, and then the application voltage is raised from the minimum value (MIN) to the target voltage value (V1) so that the lens is finally set to the target lens position.

However, where such lens position control as just described is carried out, much time is required for the adjustment of the position of the lens, and this gives rise to a problem that long time is required for automatic focusing. On the other hand, where such control is not carried out, there is a problem that displacement of the lens set position based on the hysteresis appears.

SUMMARY OF THE INVENTION

Therefore, it is demanded to provide an image pickup apparatus and a lens position adjustment method wherein, in a lens position adjustment process where a lens driving mechanism having a hysteresis is applied, the lens position is moved rapidly to a target position thereby to allow accurate lens position adjustment.

According to an embodiment of the present invention, there is provided an image pickup apparatus comprising a lens driving control section configured to execute driving control of a lens, and a main control section configured to produce lens driving control information as setting information of a lens driving mode of the lens driving control section, the main control section produces lens driving control information which includes a final setting position for the lens and a returning amount as a distance over which the lens is returned after the lens passes the setting position, the lens driving control section being operable to execute a process of moving the lens to pass the setting position once in response to the setting position and the returning amount and then execute a returning process by the returning amount to position the lens to the setting position.

The main control section may execute a process of determining the returning amount corresponding to the lens setting position by means of a table which coordinates the lens setting position and the returning amount or by an arithmetic operation process for calculating a corresponding returning amount based on the lens setting position.

The main control section may select one of returning amounts, which are set for individual regions defined by a threshold value or values determined in advance, based on the lens setting position to determine the returning amount corresponding to the lens setting position.

The main control section may be an automatic focusing control section configured to determine an in-focus position of the lens, and receive spatial frequency information acquired based on the picked up image to calculate an in-focus position of the lens as a final setting position of the lens and determine a returning amount corresponding to the calculated setting position to execute a production process of lens driving control information including the setting position and the returning amount.

According to another embodiment of the present invention, there is provided a lens position adjustment method comprising producing lens driving control information by a main control section and thus produced lens driving control information which includes a final setting position for a lens and a returning amount as a distance over which the lens is returned after the lens passes the setting position, and executing a process of moving said lens by a lens driving control section to pass the setting position once in response to the returning amount and then executing a returning process by the returning amount to position the lens to the setting position.

The step producing lens driving control information may include execution of a process of determining the returning amount corresponding to the lens setting position by means of a table which coordinates the lens setting position and the returning amount or by an arithmetic operation process for calculating a corresponding returning amount based on the lens setting position.

The step producing lens driving control information may include selection of one of returning amounts, which are set for individual regions defined by a threshold value or values determined in advance, based on the lens setting position to determine the returning amount corresponding to the lens setting position.

Where the main control section is an automatic focusing control section configured to determine an in-focus position of the lens, and the step producing lens driving control information may include reception of spatial frequency information acquired based on the picked up image to calculate an in-focus position of the lens as a final setting position of the lens and determination of a returning amount corresponding to the calculated setting position to execute a production process of lens driving control information including the setting position and the returning amount.

With the image pickup apparatus and the lens position adjustment method, for example, in a configuration wherein the lens is moved to a desired lens setting position in an automatic focusing process or a like process, at a point of time at which position setting of the lens is completed finally, a process of movement of the lens in the same direction is always executed. Consequently, occurrence of an error arising from a hysteresis can be prevented. Further, a predetermined returning amount corresponding to the lens setting position is applied to perform lens driving. Consequently, the lens can be brought to the final control position in a short period of time. Therefore, efficient and accurate lens position adjustment can be achieved.

The above and other objects, features and advantages of the present invention will become apparent from the following description and the appended claims, taken in conjunction with the accompanying drawings in which like parts or elements denoted by like reference characters. It is to be noted that, in the present specification, the term "system" is used to represent a logical set configuration of a plurality of apparatus which may be or may not be accommodated in the same housing.

BRIEF DESCRIPTION OF THE DRAWINGS

FIG. 4 is a diagram illustrating a relationship between a spatial frequency value acquired from image pickup data and the lens position in the image pickup apparatus;

DETAILED DESCRIPTION OF THE PREFERRED EMBODIMENT

Figure 1:
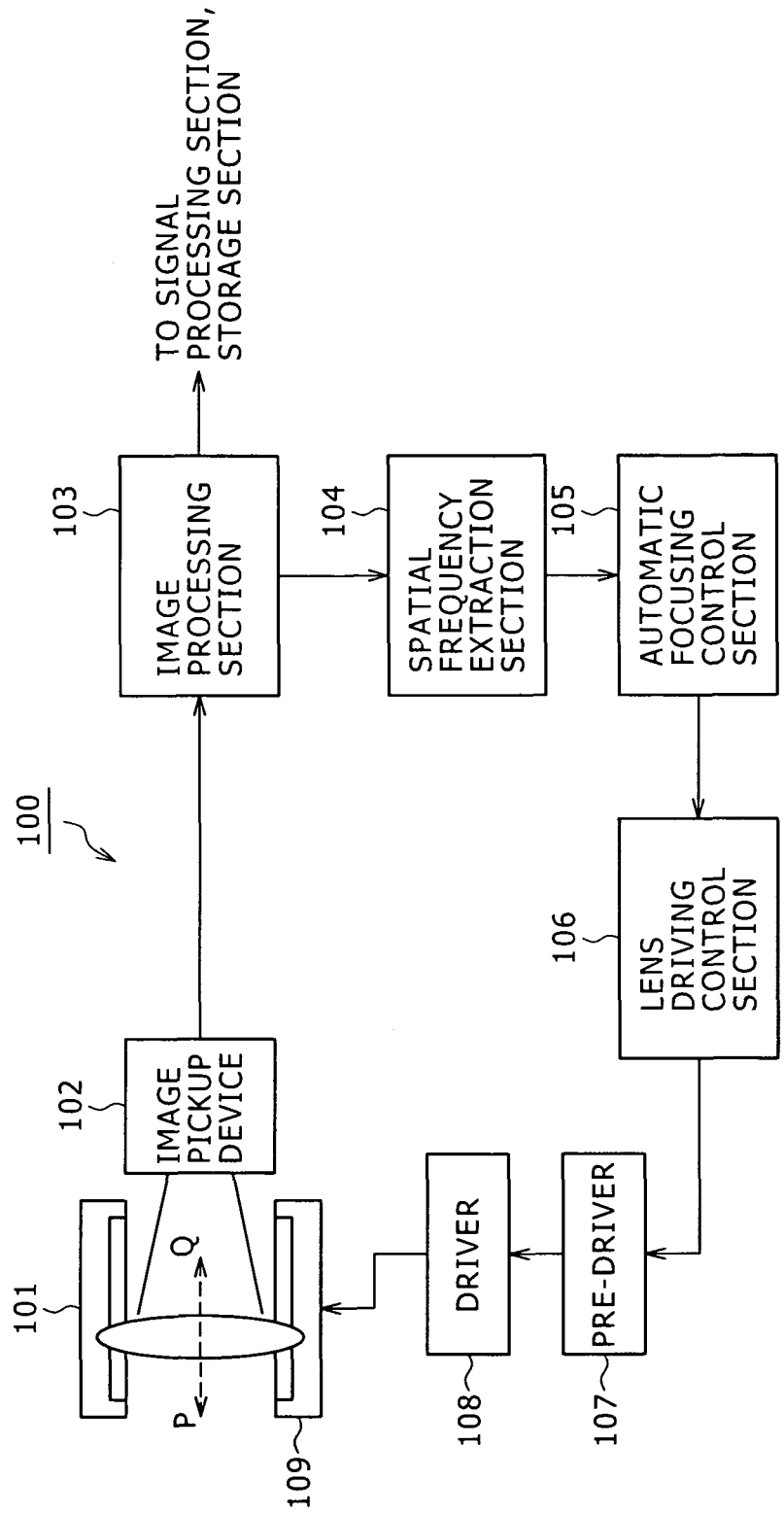
FIG. 1 is a block diagram showing an example of a configuration of an image pickup apparatus to which the present invention is applied.

Referring first to FIG. 1, there is shown a configuration of an image pickup apparatus to which the present invention is applied. The image pickup apparatus 100 shown has an automatic focusing apparatus. Incoming light through a lens section 101 is inputted to an image pickup device 102 such as, for example, a CCD (Charge Coupled Device) element, by which the incoming light is photoelectrically converted.

The photoelectric conversion data produced based on an image pickup subject is inputted to an image processing section 103, by which an image is formed based on the photoelectric conversion data. The image data produced by the image processing section 103 is inputted to a signal processing section not shown, by which various signal processes such as, for example, a compression process are performed for the image data. Then, resulting data is stored into a storage section (not shown).

The image data produced by the image processing section 103 is used to execute automatic focusing control. In particular, the image data produced by the image processing section 103 is inputted to a spatial frequency extraction section 104, by which a spatial characteristic of the image data is analyzed.

Figure 2:
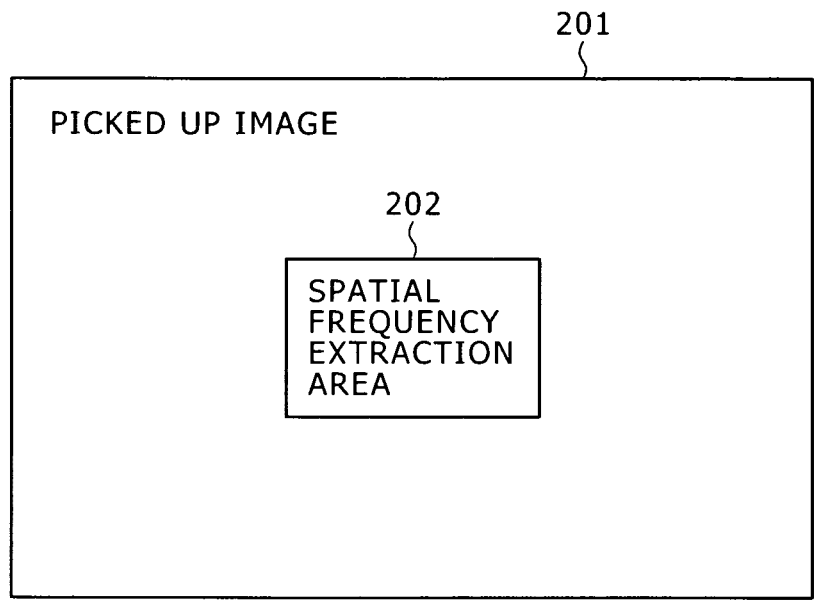
FIG. 2 is a schematic view illustrating a spatial frequency extraction process used in focusing control by the image pickup apparatus.

In particular, referring also to FIG. 2, the spatial frequency extraction section 104 sets a particular region of a picked up image 201 corresponding to the image data produced by the image processing section 103 as a spatial frequency extraction area 202 which is a signal acquisition region for focusing control. Then, the spatial frequency extraction section 104 extracts high frequency components of the spatial frequency extraction area 202 and produces integration data of the extracted high frequency components. It is to be noted that various shapes can be applied to the spatial frequency extraction area 202 and not one area but a plurality of areas may be set.

As described hereinabove, as a common method for focusing control, a method of discriminating the level of the contrast of image pickup data acquired through a lens is available. According the method mentioned, it is decided that, as spatial frequency extraction area 202 indicates a higher contrast, the image pickup data is nearer to an in-focus state, and where the contrast is low, the image pickup data is far from an in-focus state. The spatial frequency extraction section 104 performs, for example, an extraction process of high frequency components of the spatial frequency extraction area 202.

It is to be noted that the data inputted from the image processing section 103 to the spatial frequency extraction section 104 may be any of a luminance signal, a color signal or raw data of pixels. The spatial frequency extraction section 104 is formed typically from a combination of a high-pass filter, a band-pass filter and a low-pass filter.

The spatial frequency extraction section 104 inputs high frequency component data extracted from the spatial frequency extraction area 202 to an automatic focusing control section 105 which servers as a main control section. The automatic focusing control section 105 produces integration data based on the high frequency component data extracted from the spatial frequency extraction area 202 and inputted thereto from the spatial frequency extraction section 104. The automatic focusing control section 105 calculates the high frequency component integration data as evaluation value for the decision of the level of the contrast. Further, the automatic focusing control section 105 serving as a main control section produces driving control information for the lens based on the evaluation value and inputs the produced lens driving control information to a lens driving control section 106. The lens driving control information produced by the automatic focusing control section 105 is hereinafter described in detail.

The lens driving control section 106 executes lens driving control based on the lens driving control information inputted thereto from the automatic focusing control section 105. The lens driving control section 106 controls a pre-driver 107 based on the lens driving control information to produce a voltage waveform or a current waveform determined based on the lens driving control information by the lens driving control section 106.

The voltage waveform or current waveform produced by the pre-driver 107 is inputted to a driver 108. The driver 108 supplies a voltage or current corresponding to the produced voltage waveform or current waveform to a motor 109 for driving the lens section 101 so that the motor 109 drives the lens section 101. The motor 109 is formed typically from a voice coil motor. The lens section 101 is moved in the direction indicated by an arrow mark P or Q in FIG. 1 by the motor 109 to an optimal position thereby to perform focusing. It is to be noted that the pre-driver 107 or the driver 108 may be set to any of various mechanisms suitable for the motor 109 for driving the lens section 101.

Figure 3A:
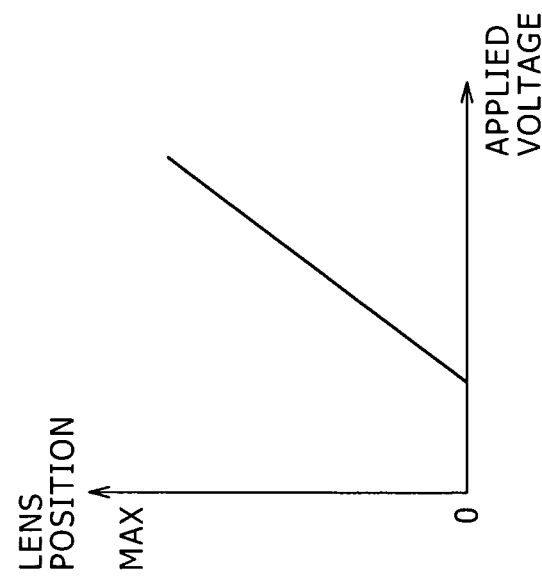
FIGS. 3A and 3B are a schematic view and a diagrammatic view, respectively, illustrating an example of a configuration of a lens driving section of the image pickup apparatus.

An example of a process where a voice coil motor is applied to the motor 109 of the lens driving section is described with reference to FIGS. 3A and 3B. FIG. 3A illustrates a principle of a voice coil motor. A lens 251 is mounted for movement to an in-focus position and has a range of movement from a start point 0 to an end point Max. If an in-focus position is determined, then a movement process for setting the lens to the position is executed by the voice coil motor. The voice coil motor urges the lens 251 with force (F) corresponding to a voltage applied thereto to move the lens.

Figure 3B:
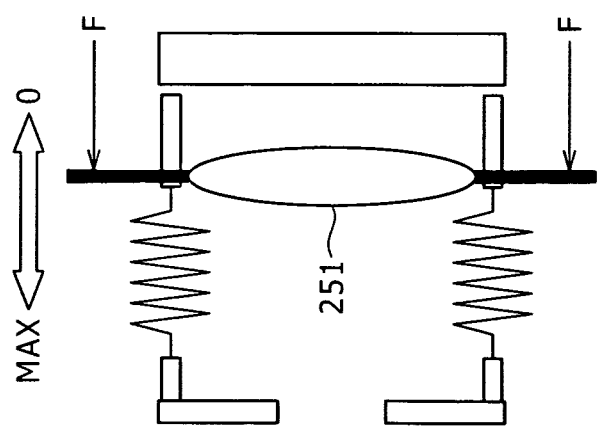

FIG. 3B is a graph illustrating a relationship between the voltage value applied in one direction to the voice coil motor and the lens position (0 to Max). If the voltage value is high, then the force (F) is strong and the amount of movement of the lens is great. Where the voice coil motor is applied to the lens driving section in this manner, the lens can be moved to a predetermined position by adjusting the voltage to be applied.

The automatic focusing control is performed by driving the lens based on the lens driving control information produced based on the spatial frequency value as an evaluation value by the automatic focusing control section 105. In particular, the automatic focusing control is performed as a process of controlling the motor 109 based on the lens driving control information so as to move the lens to an in-focus position so that the lens is finally set to a focus position (in-focus position).

A relationship between the spatial frequency value as an evaluation value calculated by the automatic focusing control section 105 and the lens position is described with reference to FIG. 4. The graph shown in FIG. 4 indicates the lens position (X) on the axis of abscissa and indicates the spatial frequency value as an evaluation value calculated by the automatic focusing control section 105 on the axis of ordinate. As described hereinabove, the spatial frequency extraction section 104 calculates a spatial frequency value as an evaluation value corresponding to the contrast of the spatial frequency extraction area 202 described hereinabove with reference to FIG. 2. It is decided that, as the spatial frequency exhibits a higher value, the contrast is higher and the image pickup data is nearer to an in-focus state, and where the spatial frequency exhibits a low value, the contrast is low and the image pickup data is far from an in-focus state.

In particular, the lens is driven to obtain a spatial frequency value corresponding to each lens position as seen in FIG. 4, and a lens position X1 at which a maximum spatial frequency value is obtained is searched out as an in-focus position. It is necessary to drive the lens determining the lens position X1, at which the maximum spatial frequency value is obtained, as an in-focus lens position. However, as described hereinabove, a driving section which typically includes a voice coil motor or the like has a hysteresis.

In particular, a lens driving mechanism including a voice coil motor or the like has a hysteresis. Therefore, if a control voltage value determined based on an evaluation value is applied to the voice coil motor to perform lens driving control, then this gives rise to the following problem. In particular, the lens position differs depending upon whether the application voltage is set to a target voltage value (V1) from a minimum value (MIN), that is, to a target voltage value (V1) calculated corresponding to the lens position X1, or is set to the target voltage value (V1) from a maximum value (MAX).

Figure 5A:
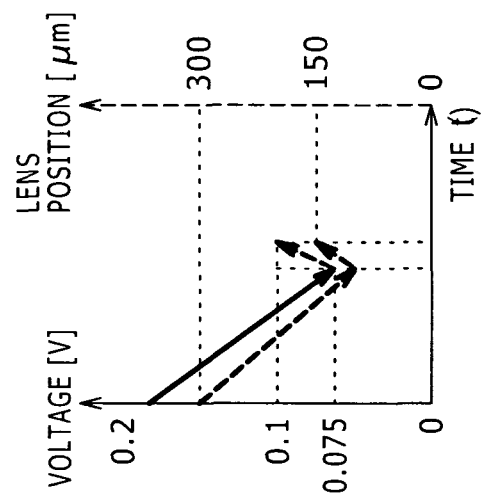
FIGS. 5A, 5B and 5C are diagrams illustrating a hysteresis in driving of a lens in the image pickup apparatus.
Figure 5B:
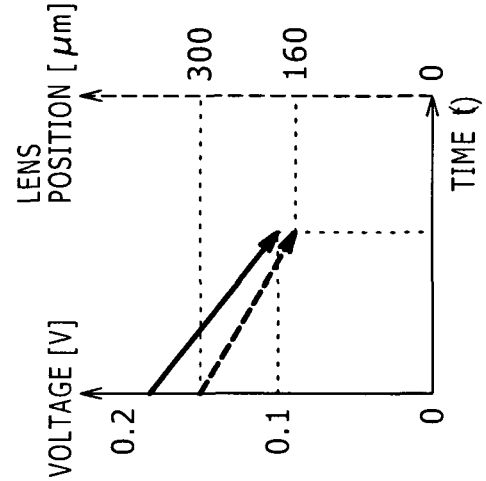
Figure 5C:
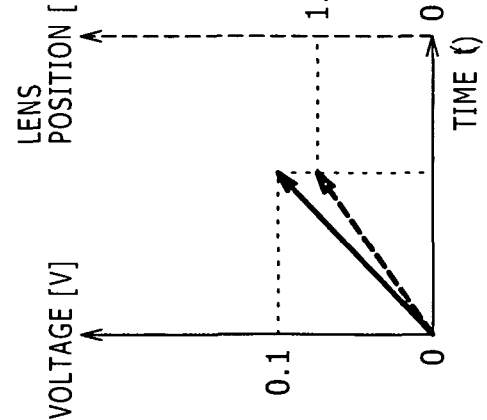

This phenomenon is described with reference to FIGS. 5A to 5C. FIGS. 5A to 5C show final lens positions where three different lens driving methods illustrated in FIGS. 5A to 5C are executed, respectively. In FIGS. 5A to 5C, the axis of abscissa indicates the time t and the axis of ordinate indicates the applied voltage V to the voice coil motor as the lens driving section and the lens position (μm). A solid line in each graph represents a variation of the applied voltage with respect to time, and a broken line represents a variation of the lens position with respect to time.

FIGS. 5A to 5C illustrate the lens positions where the voltage to be applied to the voice coil motor is set in the following manner, respectively:

FIG. 5A where the voltage is varied from 0 to 0.1,

FIG. 5B where the voltage is varied from 0.2 to 0.1, and

FIG. 5C where the voltage is varied from 0.2 to 0.075 and then to 0.1.

Where the three different voltage control schemes are performed, the final lens position, that is, the distance from the origin 0, is such as given below:

FIG. 5A lens position=150 μm

FIG. 5B lens position=160 μm

FIG. 5C lens position=150 μm

In this manner, the lens is set to the same position by the processes of FIGS. 5A and 5C. However, according to the control scheme of FIG. 5B, the lens is set to a position displaced by 10 μm from that by the processes of FIGS. 5A and 5C. In this manner, there is a problem that the final lens position differs depending upon whether the voltage value is controlled in a decreasing direction or in an increasing direction. This is a phenomenon which arises from a hysteresis and is an inevitable problem in motor driving control.

Figure 6A:
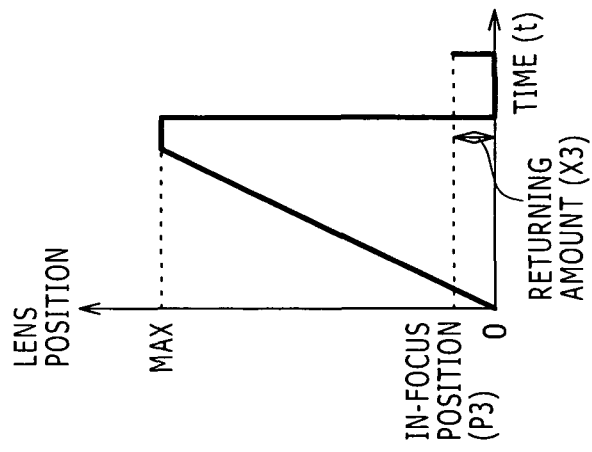
FIGS. 6A, 6B and 6C are diagrams illustrating examples of a lens driving process in the image pickup apparatus.
Figure 6B:
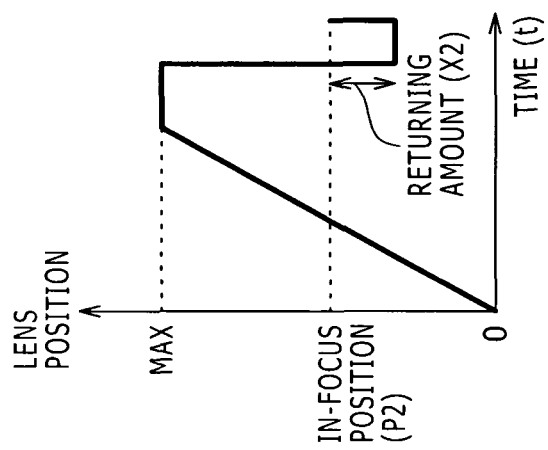
Figure 6C:
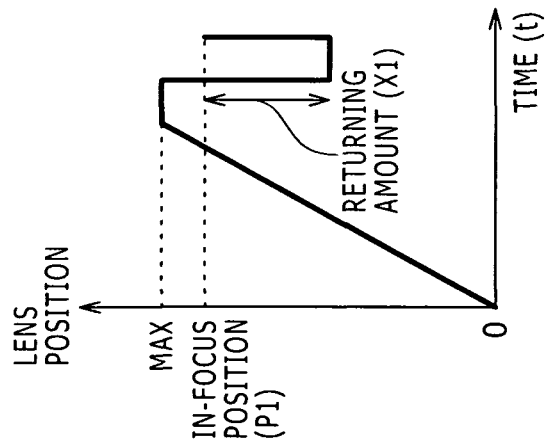

The lens driving control method to which the present invention is applied is described with reference to FIGS. 6A to 6C. The lens driving method to which the present invention is applied involves three different process examples FIGS. 6A to C for moving the lens to three different in-focus positions illustrated in FIGS. 6A to 6C, respectively. In the graphs of FIGS. 6A to 6C, the axis of abscissa indicates the time t and the axis of ordinate indicates the position of the lens. The lens moves within the range from the start point 0 to the end point Max.

FIG. 6A illustrates a process example wherein an in-focus position P1 of the lens is rather near to the end point Max;

FIG. 6B illustrates a process example wherein an in-focus position P2 of the lens is at a substantially middle position between the start point 0 and the end point Max; and FIG. 6C illustrates a process example wherein an in-focus position P3 of the lens is rather near to the start point 0.

Where the in-focus position P1 of the lens is rather near to the end point Max as seen in FIG. 6A, the lens is first moved from the start point 0 to the end point Max and then moved from the end point Max toward the start point 0 until it passes the in-focus position P1 and then overruns by a distance corresponding to a returning amount X1 from the in-focus position P1, whereafter the lens is moved toward the end point Max and set to the in-focus position P1.

Where the in-focus position P2 of the lens is at a substantially middle position between the start point 0 and the end point Max as seen in FIG. 6B, the lens is first moved from the start point 0 to the end point Max and then moved from the end point Max toward the start point 0 until it passes the in-focus position P2 and overruns by an amount corresponding to a returning amount X2 from the in-focus position P2, whereafter the lens is moved toward the end point Max and set to the in-focus position P2.

Where the in-focus position P3 of the lens is rather near to the end point Max as seen in FIG. 6C, the lens is first moved from the start point 0 to the end point Max and then moved from the end point Max toward the start point 0 until it passes the in-focus position P3 and then overruns by a distance corresponding to a returning amount X3 from the in-focus position P3, whereafter the lens is moved toward the end point Max and set to the in-focus position P3.

In this manner, according to the lens driving method to which the present invention is applied, in order to drive the lens to a final lens setting position, a process of normally driving the lens from an in-focus position Pn thereof to overrun by a predetermined returning amount Xn toward the start point 0 side once and then move back from the start point 0 side toward the end point Max side by the returning amount Xn of the overrunning distance thereby to set the lens to the in-focus position Pn. In this manner, setting the lens to the in-focus position Pn is performed normally by movement of the lens in one direction (from the start point 0 side toward the end point Max side). Consequently, appearance of an error caused by a hysteresis can be prevented, and as a result, accurate adjustment of the lens position, that is, accurate focusing control, can be achieved.

Further, according to the lens driving method to which the present invention is applied, the returning amount Xn is defined in response to the in-focus position Pn of the lens, and the overrunning process and the returning process by a distance corresponding to the defined returning amount Xn are performed. Consequently, in comparison with an alternative configuration wherein the lens is first moved to the start point 0 and then moved back, the lens can be moved to the final control position in a shorter period of time.

A relationship between the in-focus position Pn and the returning amount Xn of the lens is described with reference to FIG. 7. In the graph shown in FIG. 7, the axis of abscissa indicates the in-focus position Pn of the lens, and the axis of ordinate indicates the returning amount Xn. The in-focus position Pn of the lens is set to a position within a from the start point 0 to the end point Max by which the range of movement of the lens is defined. The returning amount Xn corresponding to any in-focus position Pn is defined by a curve shown on the graph. For example, the returning amount Xn is determined based on the in-focus position Pn of the lens such that, where the in-focus position of the lens=P1, the returning amount is set to X1, but where the in-focus position of the lens=P2, the returning amount is set to X2.

The in-focus position Pn of the lens is determined (refer to FIG. 4) in accordance with an evaluation value based on a spatial frequency by the automatic focusing control section 105 described hereinabove with reference to FIG. 1. The automatic focusing control section 105 determines the returning amount Xn based on the in-focus position Pn of the lens determined in accordance with the evaluation value. The automatic focusing control section 105 holds a table which retains a coordinated relationship between the in-focus position Pn and the returning amount Xn of the lens illustrated in FIG. 7, and determines the returning amount Xn corresponding to the in-focus position Pn based on the table.

Figure 7:
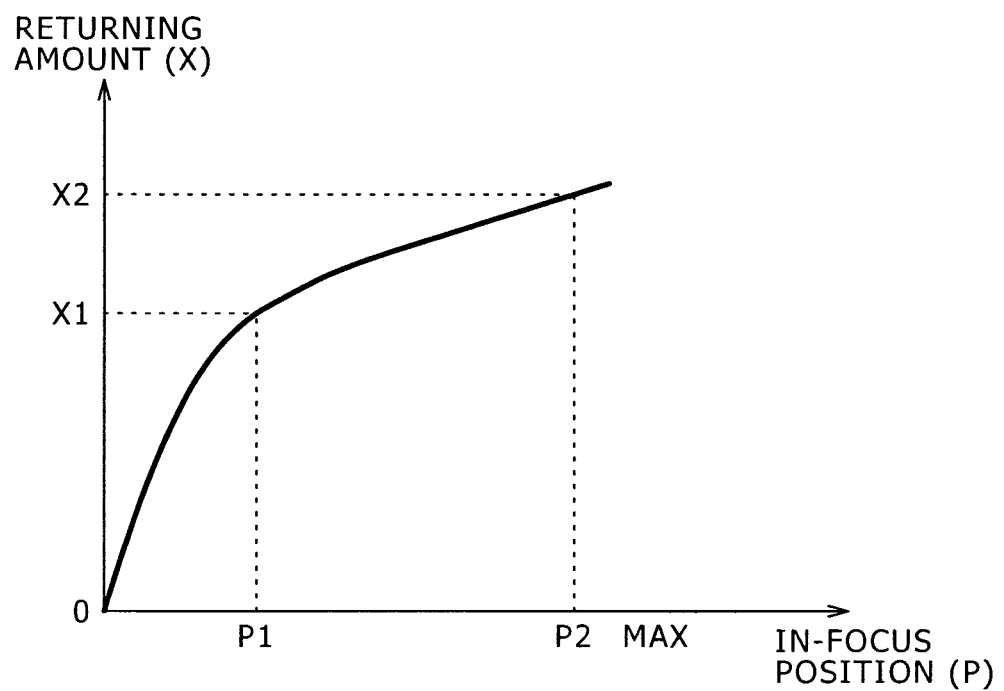
FIG. 7 is a diagram illustrating a relationship between an in-focus position and a returning amount in the image pickup apparatus.

Or, the automatic focusing control section 105 may be configured otherwise such that it applies a function corresponding to the curve on the graph shown in FIG. 7 to perform arithmetic operation for calculating the returning amount Xn using the in-focus position Pn as an input value to calculate the returning amount Xn corresponding to the in-focus position Pn.

The automatic focusing control section 105 produces lens driving control information including the in-focus position Pn and a returning amount Xn corresponding to the in-focus position Pn and inputs the produced lens driving control information to the lens driving control section 106 shown in FIG. 1. The lens driving control section 106 executes lens driving control based on the lens driving control information including the in-focus position Pn and the returning amount Xn inputted from the automatic focusing control section 105. This lens driving corresponds to the driving process described hereinabove with reference to FIG. 6.

It is to be noted that, while the relationship between the in-focus position Pn and the returning amount Xn of the lens is described hereinabove with reference to FIG. 7, the coordinated relationship between the in-focus position Pn and the returning amount Xn of the lens illustrated in FIG. 7 is a mere example. Preferably, the automatic focusing control section 105 applies an optimum coordination table between the in-focus position Pn and the returning amount Xn suitable for the driving system applied in the image pickup apparatus or an arithmetic operation expression for calculating the returning amount Xn from the in-focus position Pn. For example, the coordination table or the arithmetic operation expression is determined first based on actual measurement of the driving system applied in the image pickup apparatus. Then, the determined coordination table or arithmetic operation expression is stored into a memory of the image pickup apparatus which can be accessed by the automatic focusing control section 105. Thereafter, the automatic focusing control section 105 acquires the table or arithmetic operation expression from the memory and determines a returning amount Xn corresponding to the in-focus position Pn using the table or arithmetic operation expression.

The coordination relationship between the in-focus position Pn and the returning amount Xn of the lens illustrated in FIG. 7 is set such that, if the in-focus position of the lens differs, then the returning amount differs. However, this setting may not be adopted, but the returning amount may otherwise be set stepwise in response to in-focus positions within individually predetermined ranges while a fixed returning amount is used within each of the predetermined ranges.

Such an example of stepwise setting of the returning amount is described with reference to FIGS. 8A and 8B. In the setting example of FIGS. 8A and 8B, one threshold value position Pth is set to the range from the start point 0 to the end point Max as the range of movement of the lens. If the in-focus position Pn of the lens is set to a position between the threshold value position Pth and the end point Max, then a process wherein a fixed returning amount Xα is applied is executed. However, if the in-focus position Pn of the lens is set to another position between the start point 0 and the threshold value position Pth, then a particular returning amount is not applied, but the lens is moved (overruns) to the start point 0 first and then is returned to the in-focus position Pn.

Figure 8A:
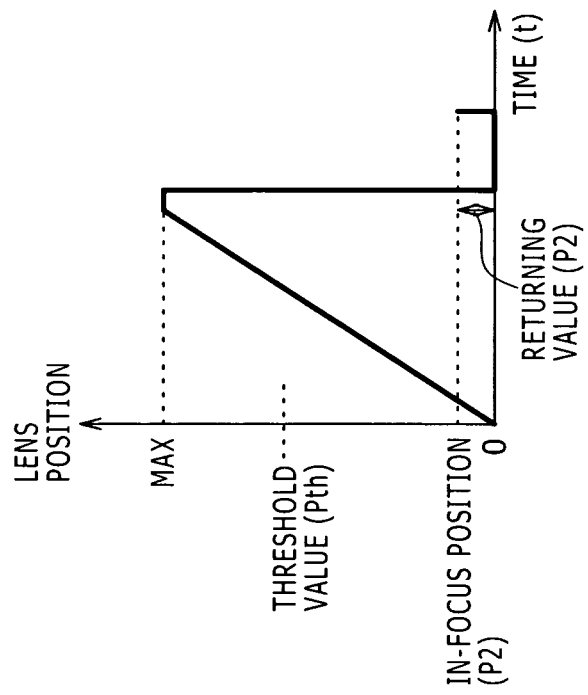
FIGS. 8A and 8B are diagrams illustrating examples of a lens driving process in the image pickup apparatus where a threshold value is set.
Figure 8B:
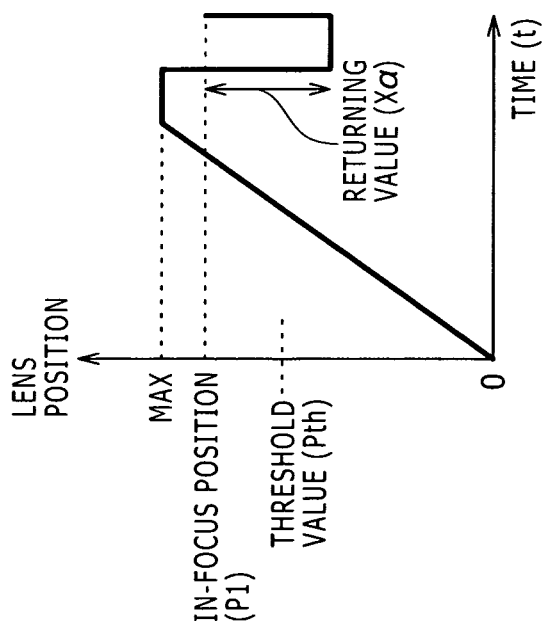

In the graphs shown in FIGS. 8A and 8B, the axis of abscissa indicate time t and the axis of ordinate indicate the position of the lens. The lens moves within the range from the start point 0 to the end point Max. FIG. 8A illustrates an example of stepwise setting wherein the in-focus position Pn of the lens is set to a position between the threshold value position Pth and the end point Max. Where the in-focus position Pn of the lens is set between the threshold value position Pth and the end point Max in this manner, a process wherein the fixed returning amount Xα is applied is executed.

In particular, the lens is first moved from the start point 0 to the end point Max and then moved from the end point Max toward the start point 0 until it passes the in-focus position P1 and overruns by a distance corresponding to the returning amount Xα from the in-focus position P1, whereafter it is moved toward the end point Max and set to the in-focus position P1.

FIG. 8B illustrates an example of stepwise setting where the in-focus position Pn is set to a position between the start point 0 and the threshold value position Pth. Where the in-focus position Pn of the lens is set between the start point 0 and the threshold value position Pth in this manner, a particular returning amount is not applied, but a process of moving the lens to overrun to the start point 0 and then returning the lens to the in-focus position Pn of the lens is executed.

In particular, after the lens first moves from the start point 0 to the end point Max, it moves from the end point Max toward the start point 0 until it passes the in-focus position P2 and overruns to the start point 0, whereafter it is moved toward the end point Max again and set to the in-focus position P2.

Even where such a simple and easy process as described above is executed, setting of the lens to the final in-focus position Pn where the lens is to be driven to move to the final lens setting position is executed always through the movement in one direction, that is, from the start point 0 side toward the end point Max side. Consequently, appearance of an error arising from a hysteresis can be prevented, and accurate adjustment of the lens position, that is, accurate focusing control, can be achieved. Further, since the returning amount Xα is applied as a returning amount where the in-focus position Pn of the lens is set to a position between the threshold value position Pth and the end point Max, when compared with an alternative configuration wherein, for example, a process of moving the lens once to the start point 0 and then moving back the lens is executed, the lens can be brought to the final control position in a shorter period of time.

Figure 9:
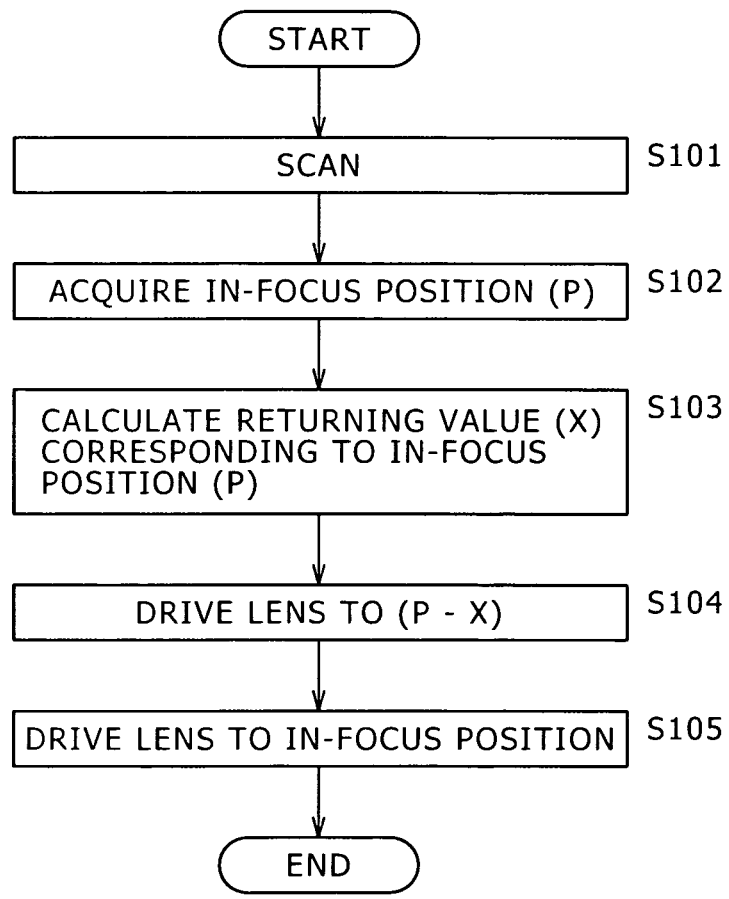
FIG. 9 is a flow chart illustrating a lens driving processing sequence in the image pickup apparatus.

A processing sequence of the lens position adjustment method for the image pickup apparatus to which the present invention is applied is described with reference to a flow chart of FIG. 9. The process illustrated in FIG. 9 is executed by processes of the components of the image pickup apparatus shown in FIG. 1. First at step S101, a scanning process is executed. This is a process of preliminarily driving the lens section 101 shown in FIG. 1 to execute extraction of variations in contrast at various positions, that is, extraction of high frequency components in a spatial frequency extraction area described hereinabove with reference to FIG. 2 to acquire a position at which the contrast is highest, that is, an in-focus position.

At step S102, an in-focus position is determined based on a result of the scanning. In particular, the spatial frequency extraction section 104 shown in FIG. 1 executes extraction of high frequency components in a spatial frequency extraction area described hereinabove with reference to FIG. 2, and the automatic focusing control section 105 calculates integration data based on high frequency component data inputted thereto from the spatial frequency extraction section 104 as an evaluation value and determines the in-focus position P based on the evaluation value.

Then at step S103, a returning amount X corresponding to the in-focus position P is calculated. In particular, the automatic focusing control section 105 serving as a main control section produces, as driving control information of the lens based on the evaluation value, driving control information including the in-focus position P and the returning amount X corresponding to the in-focus position P. The returning amount X corresponding to the in-focus position P is calculated by application of the table stored in the memory of the image pickup apparatus or by the arithmetic operation process as described hereinabove.

Then at steps S104 and S105, driving of the lens is performed. The driving sequence of the lens is executed as a process described hereinabove with reference to FIGS. 6A to 8B. In particular, the lens is first moved from the start point 0 to the end point Max and then moved back from the end point Max until it passes the in-focus position P and overruns by the returning amount X, whereafter the lens is moved from the start point 0 side toward the in-focus position P and set to the in-focus position P. This process is executed at steps S104 and S105.

In this manner, in the image pickup apparatus to which the present invention is applied, while it is configured such that the lens is driven to move to a desired lens setting position, the process of completing final setting of the position of the lens is executed always as a process of moving the lens in the same direction. Consequently, appearance of an error arising from a hysteresis can be prevented. Further, since a predetermined returning amount corresponding to the lens setting position is applied, the lens can be brought to the final control position in a short period of time.

It is to be noted that, while in the embodiment described hereinabove, focusing control is performed as an example of a driving process of the lens, the present invention can be applied to control which involves movement of the lens such as, for example, a zooming process. In any such control, accurate setting of the lens position which eliminates a hysteresis and an efficient process which reduces the processing time can be achieved similarly as described above.

A preferred embodiment of the present invention is described above. However, it is a matter of course that the present invention is not limited to the specific embodiment described above. It is apparent that various alterations or modifications may be made by those skilled in the art within the scope of the invention described in the claims, and it is to be understood that also such alterations and modifications naturally fall within the technical scope of the present invention.

What is claimed is:

1. An image pickup apparatus, comprising:
an image processing section for producing image data;
a spatial frequency extraction section for setting a region of an image as a spatial frequency extraction area, extracting high frequency components of the spatial frequency extraction area, and producing integration data of the extracted high frequency components, the spatial frequency extraction section receiving the image data for the image from the image processing section;
a lens driving control section configured to execute driving control of the lens;

a pre-driver controlled by the lens driving control section for producing a voltage waveform or a current waveform;

a driver for driving a lens, the voltage waveform or the current waveform produced by the pre-driver being inputted to the driver; and a main control section configured to produce lens driving control information for the lens driving control section, the lens driving control information including an in-focus position for said lens, a final setting position for said lens, and a returning amount, the returning amount being a distance over which said lens is returned after said lens passes the in-focus position, wherein said lens driving control section being operable to execute the process of moving said lens to pass the in-focus position once in response to the returning amount and then execute a returning process by the returning amount to position said lens to the final setting position, wherein the spatial frequency extraction section is formed from a combination of a high-pass filter, a band-pass filter, and a low-pass filter, and wherein said main control section executes a process of determining the returning amount corresponding to the lens setting position by means of a table in which the returning amount varies non-linearly with respect to the lens setting position.

2. The image pickup apparatus according to claim 1, wherein said main control section selects one of returning amounts, which are set for individual regions defined by a threshold value or values determined in advance, based on the lens setting position to determine the returning amount corresponding to the lens setting position.

3. The image pickup apparatus according to claim 1, wherein said main control section is an automatic focusing control section configured to determine an in-focus position of said lens, and receives spatial frequency information acquired from the spatial frequency extraction section to calculate an in-focus position of said lens as a final setting position of said lens and determine a returning amount corresponding to the calculated setting position to execute a production process of lens driving control information including the setting position and the returning amount.

4. A lens position adjustment method comprising the steps of:

setting a region of an image as a spatial frequency extraction area for focusing control by a spatial frequency extraction section, the spatial frequency extraction section receiving image data for the image from an image processing section, extracting high frequency components of the spatial frequency extraction area, and producing integration data of the extracted high frequency components, the spatial frequency extraction section being formed from a combination of a high-pass filter, a band-pass filter, and a low-pass filter;

producing lens driving control information by a main control section and thus produced lens driving control information which includes an in-focus position for a lens, a final setting position for said lens, and a returning amount, the returning amount being a distance over which said lens is returned after said lens passes the in-focus position; and executing a process of moving said lens by a lens driving control section to pass the in- focus position once in response to the returning amount and then executing a returning process by the returning amount to position said lens to the final setting position, wherein a pre-driver is controlled by the lens driving control section for producing a voltage waveform or a current waveform, and the voltage waveform or the current waveform produced by the pre-driver is inputted to a driver for driving the lens, and wherein the step producing lens driving control information includes execution of a process of determining the returning amount corresponding to the lens setting position by means of a table in which the returning amount varies and is dependent on the lens setting position.

5. The lens position adjustment method according to claim 4, wherein the step producing lens driving control information includes selection of one of returning amounts, which are set for individual regions defined by a threshold value or values determined in advance, based on the lens setting position to determine the returning amount corresponding to the lens setting position.

6. The lens position adjustment method according to claim 4, wherein said main control selection is an automatic focusing control section configured to determine an in-focus position of said lens, and the step producing lens driving control information includes reception of spatial frequency information acquired from the spatial frequency extraction section to calculate an in-focus position of said lens as a final setting position of said lens and determination of a returning amount corresponding to the calculated setting position to execute a production process of lens driving control information including the setting position and the returning amount.

* * * * *